(12) United States Patent
White et al.

(10) Patent No.: US 7,340,428 B1
(45) Date of Patent: Mar. 4, 2008

(54) SYSTEM AND METHOD FOR USING COMPOSITE SCORING IN AN AUCTION PROCESS

(75) Inventors: David White, Reston, VA (US); Ingrid M. Solis, Rockville, MD (US); Joshua J. D. Martin, Arlington, VA (US)

(73) Assignee: GXS, Inc., Gaithersburg, MD (US)

( * ) Notice: Subject to any disclaimer, the term of this patent is extended or adjusted under 35 U.S.C. 154(b) by 1166 days.

(21) Appl. No.: 09/722,607

(22) Filed: Nov. 28, 2000

(51) Int. Cl.
*G06Q 40/00* (2006.01)

(52) U.S. Cl. .............................. 705/37; 705/27; 705/35

(58) Field of Classification Search .................. 705/37, 705/80, 26, 35, 27
See application file for complete search history.

(56) References Cited

U.S. PATENT DOCUMENTS

| | | | | |
|---|---|---|---|---|
| 3,581,072 | A * | 5/1971 | Nymeyer ..................... | 705/37 |
| 5,136,501 | A * | 8/1992 | Silverman et al. ............ | 705/37 |
| 5,724,524 | A * | 3/1998 | Hunt et al. .................... | 705/37 |
| 5,799,151 | A * | 8/1998 | Hoffer ......................... | 709/204 |
| 5,905,974 | A * | 5/1999 | Fraser et al. .................. | 705/37 |
| 5,905,975 | A * | 5/1999 | Ausubel ....................... | 705/37 |
| 5,918,218 | A * | 6/1999 | Harris et al. .................. | 705/37 |
| 5,924,082 | A * | 7/1999 | Silverman et al. ............ | 705/37 |
| 5,995,947 | A * | 11/1999 | Fraser et al. .................. | 705/38 |
| 6,016,483 | A * | 1/2000 | Rickard et al. ............... | 705/37 |
| 6,021,398 | A * | 2/2000 | Ausubel ....................... | 705/37 |
| 6,023,685 | A * | 2/2000 | Brett et al. .................... | 705/37 |
| 6,029,146 | A * | 2/2000 | Hawkins et al. .............. | 705/35 |
| 6,044,363 | A * | 3/2000 | Mori et al. .................... | 705/37 |
| 6,058,379 | A * | 5/2000 | Odom et al. .................. | 705/37 |
| 6,115,698 | A * | 9/2000 | Tuck et al. .................... | 705/37 |
| 6,134,536 | A * | 10/2000 | Shepherd ...................... | 705/37 |
| 6,157,918 | A * | 12/2000 | Shepherd ...................... | 705/37 |
| 6,161,099 | A * | 12/2000 | Harrington et al. ........... | 705/37 |
| 6,647,373 | B1 * | 11/2003 | Carlton-Foss ................ | 705/37 |
| 2003/0014326 | A1 * | 1/2003 | Ben-Meir et al. ............. | 705/26 |
| 2003/0055729 | A1 * | 3/2003 | Bezos et al. .................. | 705/14 |

FOREIGN PATENT DOCUMENTS

WO    WO 01/98981 A1 * 12/2001

OTHER PUBLICATIONS

Business Editors/High-Tech Writers, Perfect's B2B Sourcing Platform Includes Patent-Pending Intellectual Property Containing More than 150 Unique Claims, Business Wire. New York: Oct. 30, 2000. p. 1.*

(Continued)

*Primary Examiner*—Hani M. Kazimi
*Assistant Examiner*—Stefano Karmis
(74) *Attorney, Agent, or Firm*—Foley and Lardner LLP

(57) ABSTRACT

A system and method for conducting an auction for a sponsor includes setting a composite score for each bid submitted to the auction. The setting of the composite score includes selecting at least one of a plurality of categories as evaluation criteria for each bid, setting parameters for each of the selected categories, and specifying a weighting for each of the selected categories. Bids are received from one or more participants, each bid including information corresponding to the selected categories. A score is determined for each received bid based on the parameters and weighting for each category and the information in the bid, and the participant having the highest score is notified.

18 Claims, 6 Drawing Sheets

OTHER PUBLICATIONS

Scoring System for Bids in Logging Auction, The Jakarta Post. Jakarta: Aug. 25, 1998. p. 1.*

Feldman, Robert A., Reinhart, Vincent. Auction Format Matters: Evidence on Bidding Behavior and Seller Revenue. International Monetary Fund. Staff Papers-International Monetary Fund. Washington: Jun. 1996. vol. 43, Iss. 2; p. 395, 24 pgs.*

* cited by examiner

Back | Forward | Stop | Refresh | Home | Search | History | Print

Address  http://topaz.is.ge.com/range.html

General Auction Information

Composite Score

| | | Weighting | Lead Bid |
|---|---|---|---|
| | Price  6000 | 1 | 82 |
| 83 | Distance 475 | 3 | Your Most Recent |
| | Lead Time 8 | 2 | 75 |

Check Score   Submit

FIG. 6

SYSTEM AND METHOD FOR USING COMPOSITE SCORING IN AN AUCTION PROCESS

FIELD OF THE INVENTION

The present invention relates generally to an auction process, and more particularly to a system and method for creating a composite score to evaluate bids submitted in an auction process.

BACKGROUND OF THE INVENTION

With the advent of the Internet, manufacturers, retailers and consumers have used online auctions to buy and sell merchandise. Online auctions are available that are run both as forward auctions and as reverse auctions. In a forward auction, the sponsor of the auction is typically selling a product or service and is seeking the highest price from the various participants in the auction. More specifically, the sponsor provides details about the subject of the auction, and may delineate who may participate in the auction. The participants in the auction then submit their bids to the online auction. When the auction is complete, the subject of the auction, i.e. the product or service, is awarded to the highest bidder.

In a reverse auction, the sponsor of the auction is typically seeking to purchase a product or service and is seeking the lowest price from the various participants in the auction. The sponsor provides details about what the sponsor is seeking to purchase, and may also delineate who may participate in the auction. The participants in the auction submit bids to the online auction. In contrast to the forward auction, when the auction is complete, the subject of the auction is awarded to the lowest bidder.

Using the Internet to conduct the auction has made the process more efficient. Specifically, it is unnecessary for the sponsor of the auction and the participants in the auction to be at the same location to conduct the auction. Rather, the sponsor and the participants may participate in the auction from any location and access the auction from their location with a computer connected to the Internet.

There are some limitations, however, to an online auction. Currently, sponsors of an auction are limited to electronically evaluating participants based on price and quantity. Additional qualitative (e.g. quality, past performance) and quantitative (e.g. delivery time, location) measures are examined outside of the system. To clarify, current auction systems do not allow sponsors to compare participants on an "all factors being equal" basis. Some participants will excel in quality, but demand a premium on products. Current applications do not account for this type of factor.

SUMMARY OF THE INVENTION

Briefly, a method consistent with the present invention for conducting an auction for a sponsor includes setting a composite score for each bid submitted to the auction. The setting of the composite score includes selecting at least one of a plurality of categories as evaluation criteria for each bid, setting parameters for each of the selected categories, and specifying a weighting for each of the selected categories. Bids are received from one or more participants, each bid including information corresponding to the selected categories. A weighted value is calculated for each one of the selected categories based on the parameters and weighting for each of the selected categories and the information in the bid, and a score is determined for each received bid based on the weighted values for each of the selected categories. The bid having the highest score is then identified.

In another aspect of the present invention, the participants who may submit bids to the auction are designated.

In yet another aspect of the present invention, at least one of the selected categories is set to a value provided by the sponsor, wherein the at least one of the selected categories set to a value provided by the sponsor relates to an evaluation of the participant by the sponsor.

In still another aspect of the present invention, a window in a graphical user interface for an auction comprises an auction window operable to display information describing the content of the auction as provided by a sponsor of the auction. The window in the graphical user interface further comprises a composite score window operable to display at least two of a plurality of categories selected as evaluation criteria for a bid, a value entered for each of the selected categories, and a composite score calculated according to the values entered for each of the selected categories, parameters set for each of the selected categories, and a weighting specified for each of the selected categories.

BRIEF DESCRIPTION OF THE DRAWINGS

FIGS. 4a-4d are examples of views of a graphical user interface used in conjunction with the process of FIG. 3.

FIG. 6 is an example of a view of a graphical user interface used in conjunction with the process of FIG. 5.

DETAILED DESCRIPTION OF THE PREFERRED EMBODIMENT

Figure 1:
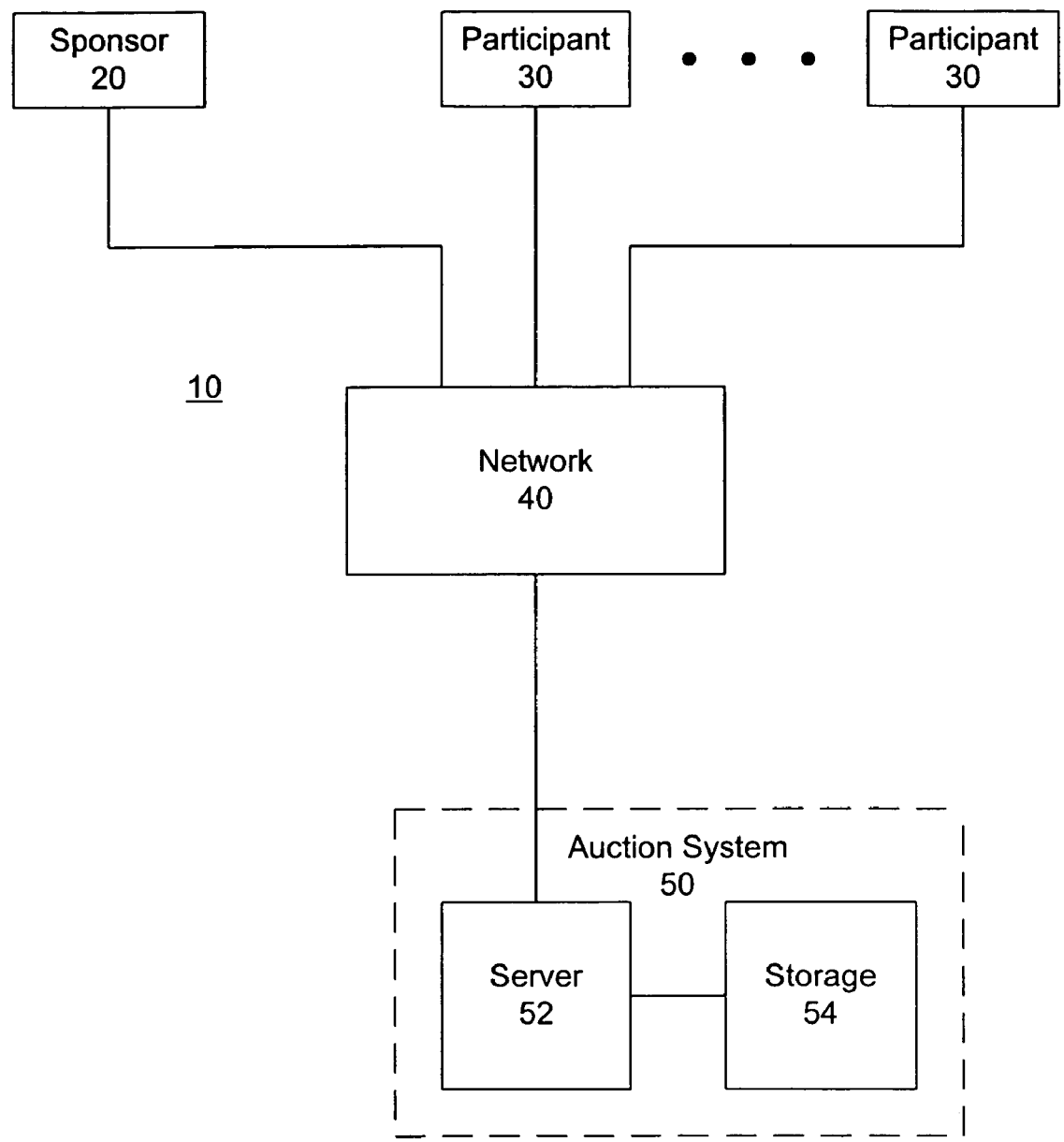
FIG. 1 is a block diagram of a composite scoring system consistent with the present invention.

FIG. 1 is a block diagram of a composite scoring system consistent with the present invention. As shown in FIG. 1, a composite scoring system 10 includes a sponsor 20, one or more participants 30, a network 40 and an auction system 50. The sponsor 20 and the participant 30 may connect to the auction system 50 via the network 40.

The sponsor 20 may include a workstation having a CPU, a main memory, a ROM, a storage device and a communication interface all coupled together via a bus. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage.

A communication interface provides a two-way data communication coupling via a network link to the network 40. For example, if the communication interface is an integrated services digital network (ISDN) card or a modem, the communication interface provides a data communication connection to the corresponding type of telephone line. If the communication interface is a local area network (LAN) card, the communication interface provides a data communication connection to a compatible LAN. Wireless links are also possible. In any such implementation, the communication interface sends and receives electrical, electromagnetic or optical signals, which carry digital data streams representing different types of information, to and from the network 40. The network 30 may be implemented, for example, as a LAN or as a public network, such as the Internet.

The sponsor 20 can send messages and receive data, including program code, through the network 40. If the network 40 is implemented as the Internet, the auction system 50 can transmit a requested code for an application program through the Internet, an ISP, the local network and the communication interface. The received code can be executed by the CPU in the workstation of the sponsor 20 as it is received, stored in the storage device, or stored in some other non-volatile storage for later execution. In this manner, the sponsor 20 may obtain application code in the form of a carrier wave.

Each participant 30 may be implemented in the same manner as the sponsor 20. In particular, each participant 30 may include a workstation having a CPU, a main memory, a ROM, a storage device and a communication interface all coupled together via a bus. Each participant may also include a communication interface, which provides a two-way data communication coupling via a network link to the network 40. Like the sponsor 20, the participant 30 can send messages and receive data, including program code, through the network 40.

The auction system 50 includes a server 52 and a storage 54. The server 52 may have the same elements as the workstation of the sponsor 20 and the participant 30, including a CPU, a main memory, a ROM, and a communication interface all coupled together via a bus. The storage 54 may be implemented as a non-volatile storage that may be incorporated into the server 52 or may be outside of the server 52. The storage 54 may be implemented as a single storage device or may be a plurality of storage devices located in a single location or distributed across multiple locations. The storage 54 includes a database, which stores information regarding the different auctions that may be run on the auction system 50.

Figure 2:
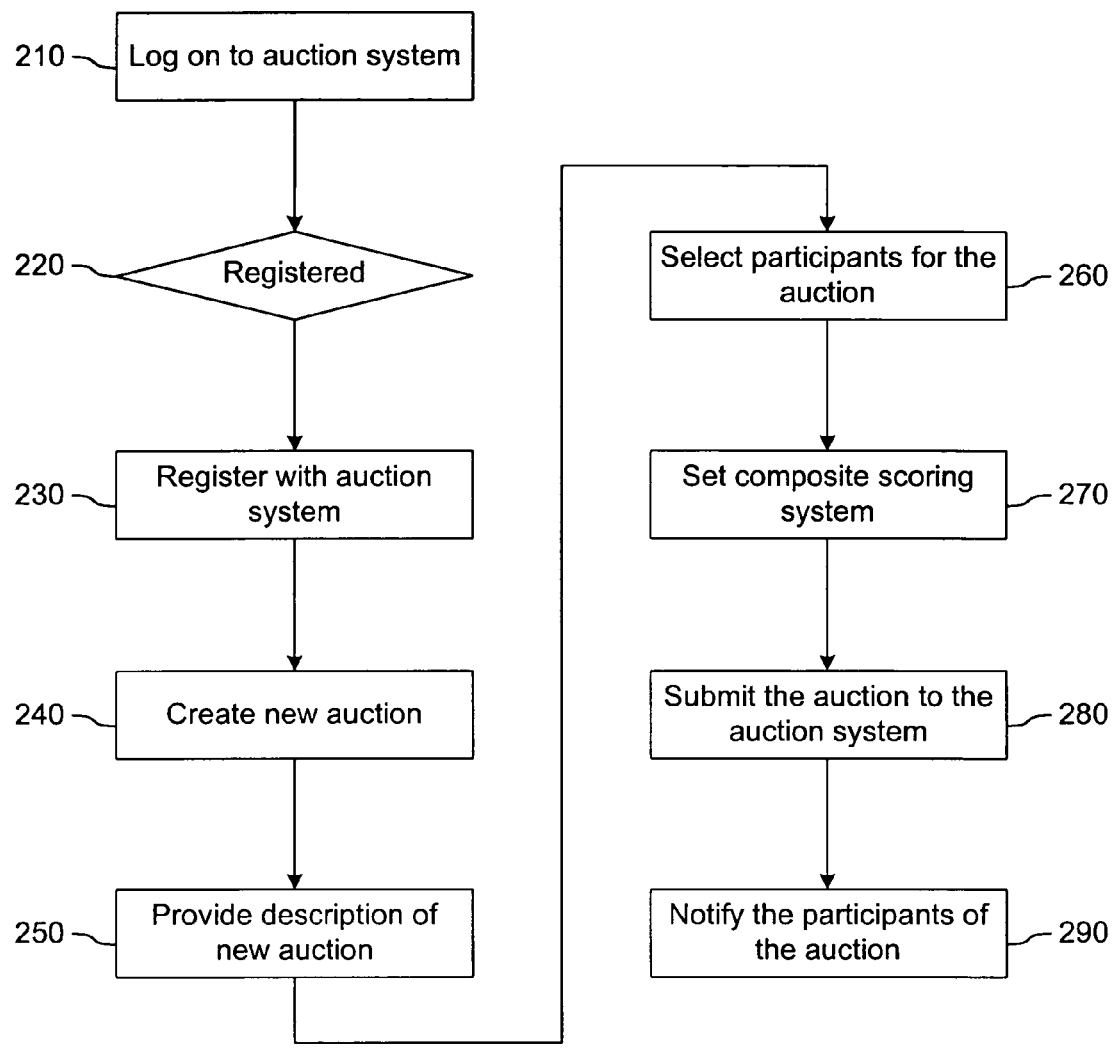
FIG. 2 is a flow diagram of a process for creating an auction consistent with the present invention.

FIG. 2 is a flow diagram of a process for creating an auction consistent with the present invention. As shown in FIG. 2, a sponsor 20 logs on to the auction system 50 (step 210). If the network 40 is implemented as the Internet, then the sponsor 20 may access the auction system 50 by accessing the Internet, such as through an Internet Service Provider (ISP), locate the web site at which the auction system 50 is located, and connect to that web site. To then log on to the auction system 50, the sponsor 20 may be required to enter a username and password before being given access to the content of the auction system 50. If the network 40 is implemented as a LAN, then the sponsor 20 may access the auction system 50 directly from the sponsor workstation.

After logging on to the auction system 50, it is determined whether the sponsor 20 is registered (step 220). This determination may be made automatically when the sponsor 20 logs on to the auction system 50. For example, if the auction system 50 is accessed through a web site over the Internet, a cookie may be left in the workstation of the sponsor 20 when the sponsor 20 is originally registered, and the cookie is read automatically by the auction system 50 when the sponsor logs on to determine whether the sponsor 20 is registered.

If the sponsor 20 is not registered, then the sponsor 20 may be required to register with the auction system 50 (step 230). Registration with the auction system 50 may require the sponsor 20 to enter identification information and other relevant information, as well as to create a username and password. For example, if the sponsor 20 is a manufacturing company selling a particular product, the other relevant information may include information such as the sponsor's product, details about the product, and a list of participants 30 with which the sponsor 20 has relationships. Depending on the auction system 50, the sponsor 20 may need to pay a fee to register, or may need permission to register from a person running the auction system 50. Although registration is not required, it allows the sponsor 20 to enter identification and other relevant information that may be needed to work with the auction system 50 the first time the sponsor 20 accesses the auction system 50 and have that information available for future accesses without re-entry.

Having logged on and registered with the auction system 50, the sponsor 20 may create a new auction (step 240). The application for executing the auction process consistent with the present invention is preferably running on the server 52, although a version of the application may be downloaded from the server 52 to the sponsor 20. To effect the creation of the auction, the sponsor 20 may select, such as by a mouse click, an option for creating the auction from a menu provided by the application executing the auction process. The menu may be displayed through a graphical user interface (GUI) provided by the server 52.

In response to the creation of the new auction, the sponsor 20 provides a description of the new auction (step 250). After selecting the option to create the new auction, a window may be displayed to the sponsor 20 through which the sponsor 20 can enter the description of the new auction. The description of the new auction may include all of the details regarding the product or service that the sponsor 20 is seeking to purchase or to sell. These details include, for example, the name of the product or service, a description of it, a target price, the amount to be purchased or sold, the timing for a contract and delivery of the product or service, and any other information that may be useful to the participant 30 when submitting a bid. The description may also include attachments, such as figures, drawings, pictures or text, which help to describe the product or service more completely.

In addition to providing a description of the auction, the sponsor 20 may select the of participants 30 from which the sponsor 20 wishes to solicit bids (step 260). The participants 30 may be selected from a list of participants 30 who have registered with the auction system 50. Alternatively, the sponsor 20 may provide a list of participants 30 that correspond to common trading partners with the sponsor 20 or that correspond to participants 30 who have previously bought or sold the product or service that is the subject of the auction.

Figure 3:
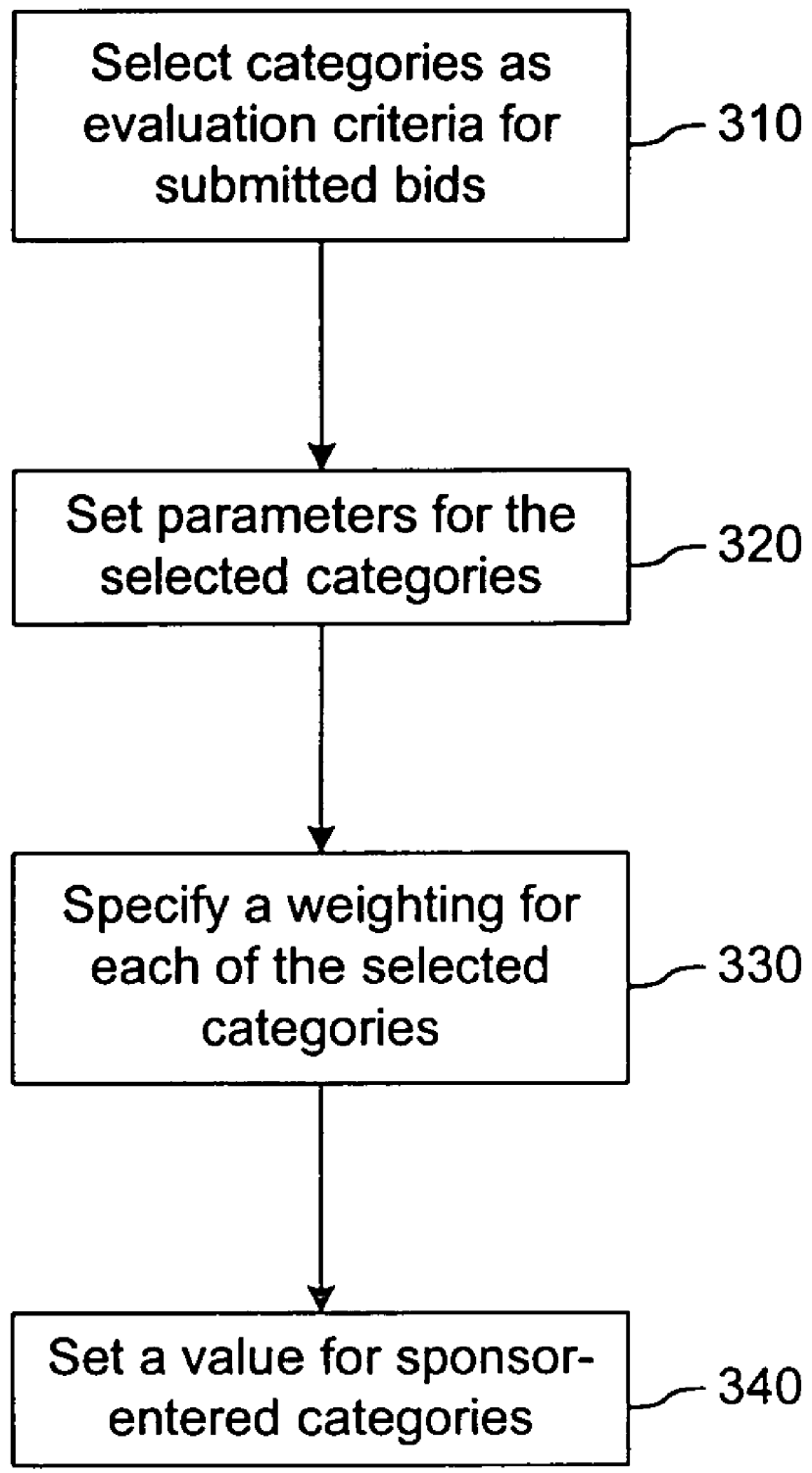
FIG. 3 is a flow diagram of a process for developing a composite score consistent with the present invention.

The sponsor 20 then sets the composite scoring system (step 270). FIG. 3 is a flow diagram of a process for setting the composite scoring system consistent with the present invention. As shown in FIG. 3, the first step in the process is to select one or more categories for evaluation criteria of submitted bids (step 310). More specifically, a sponsor 20 may select 1 to n number of categories to be included in the evaluation criteria. The categories may be displayed in a window of the GUI provided by the server 52. The sponsor 20 may select the categories displayed in the window by clicking on each desired category, such as with a mouse click.

Examples of categories include, for example, price, past performance, lead time, payables outstanding, days turnover, industry certification, volume considerations, distance, location, warranties, incentives. Each of the categories has some type of quantifiable value, although not necessarily a number. For example, price is based on a number, but industry certification is not.

Figures 4A, 4B, 4C, 4D:
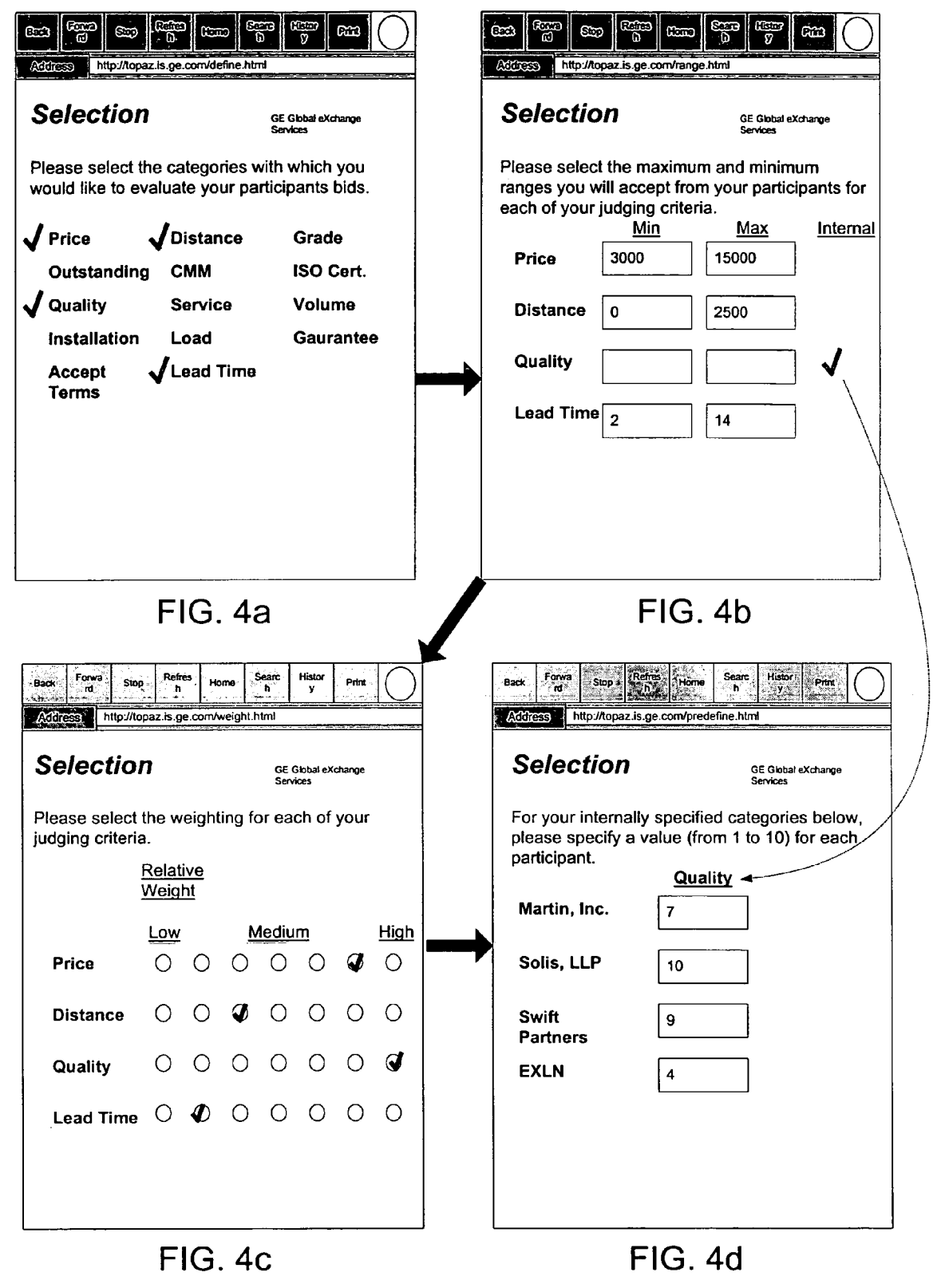

FIG. 4a shows an example of a GUI for selecting categories to be used in the composite scoring system. As shown in FIG. 4a, the GUI shows a plurality of categories that a sponsor 20 may select to include as evaluation criteria for submitted bids. The GUI also reflects that a category has been selected as an evaluation criterion by placing a checkmark next to it, although other selection indications may be used, such as highlighting the selected category. In FIG. 4a, the selected categories include price, distance, quality and lead time.

Categories may also be added to the auction system 50 by the sponsor 20. The sponsor may select a 'new category' option from a menu in the GUI and then enter information describing the category. The category information includes, for example, a title, a description of what it measures, and a suggested measurement system for the category.

The sponsor 20 then sets various parameters for each of the selected categories (step 320). These parameters include, for example, applicable ranges, a higher is better or lower is better determination, and scaling. The parameters also include an indication of whether a category value is participant-entered or sponsor-entered. Should the category value be sponsor-entered, the sponsor 20 inputs an appropriate value as discussed below.

FIG. 4b shows an example of a GUI for setting the parameters to be used in the composite scoring system. As shown in FIG. 4b, the sponsor 20 is able to set the parameters for the categories selected from the GUI shown in FIG. 4a, i.e., price, distance, quality and lead time. Of these four categories, three of them are participant-entered and one is sponsor-entered. The sponsor-entered category is for quality. To indicate that the quality category is sponsor-entered, the sponsor 20 submits an input to the auction system 50 that selects the quality category as being sponsor-entered. In response to the input, an indication is shown that the quality category is sponsor-entered. In FIG. 4b, the indication is shown as a check mark under the column marked 'Internal,' although other indications may be used, such as a highlight.

For the price category, the sponsor 20 has set the parameters as being between 3000 and 15000 of whatever monetary unit is applicable, typically U.S. dollars. The distance category is set between 0 and 2500 in a distance unit, such as miles, and is based on the distance of the participant 30 from the sponsor 20. The lead time category is set between 2 and 14 and is a measurement of the amount of time, such as days, between the time the order is made and the time the order is delivered.

After setting the parameters for the selected categories, the sponsor 20 specifies a weighting for each category (step 330). The weightings specified by the sponsor 20 determine the effect each category has on the final composite score. The sponsor 20 may give greater weightings to categories more important to the sponsor 20 and give lesser weightings to categories less important to the sponsor 20.

FIG. 4c shows an example of a GUI for specifying the weightings to be used in the composite scoring system. As shown in FIG. 4c, each of the categories is given a relative weighting between low and high. More specifically, the quality and price categories are given relatively high weightings and the distance and lead time categories are given relatively low weightings. Although the weightings are shown as being between low and high, other weightings may be used, such as a value between 1 and 10 or a percentage.

To complete the setting of the composite scoring system, the sponsor 20 sets the values for the sponsor-entered categories (step 340). If a category has been specified as being "sponsor-entered," the sponsor 20 enters a corresponding value for each category for each participant 30 in the auction. As discussed above, the sponsor 20 has the opportunity to select which participants 30 may bid in the auction. In the example shown in FIG. 4b, the sponsor-entered category was for quality.

FIG. 4d shows an example of a GUI for setting the values of a sponsor-entered category to be used in the composite scoring system. As shown in FIG. 4d, the sponsor 20 enters a quality value for four different participants 30. Although the range of values is shown as being between 1 and 10, other ranges, both numerical and descriptive may be used.

Having set the composite scoring system, the sponsor 20 then submits the auction to the auction system 50 (step 280). The information that is submitted to the auction system 50 includes the description of the new auction, the selected participants 40, and the setting of the composite scoring system. The information may be merged into a single file that is transferred from the sponsor 20 to the auction system 50 via the network 40. The filed that is submitted to the auction system 50 is received by the server 52 and stored in the storage 54.

After receiving the auction information from the sponsor 20, the auction system 50 notifies each of the participants 30 of the auction (step 290). To identify the participants 30, the auction system 50 may parse the auction information submitted by the sponsor 20 and determine which participants 30 are identified in the auction information. The notification may be sent to the participants, for example, by e-mail. The e-mail is transmitted to each of the participants 30 from the auction system 50 via the network 40. Each e-mail preferably provides details about the auction including the time of the auction, the subject of the auction, and optionally, the categories and parameters of the composite scoring system.

Figure 5:
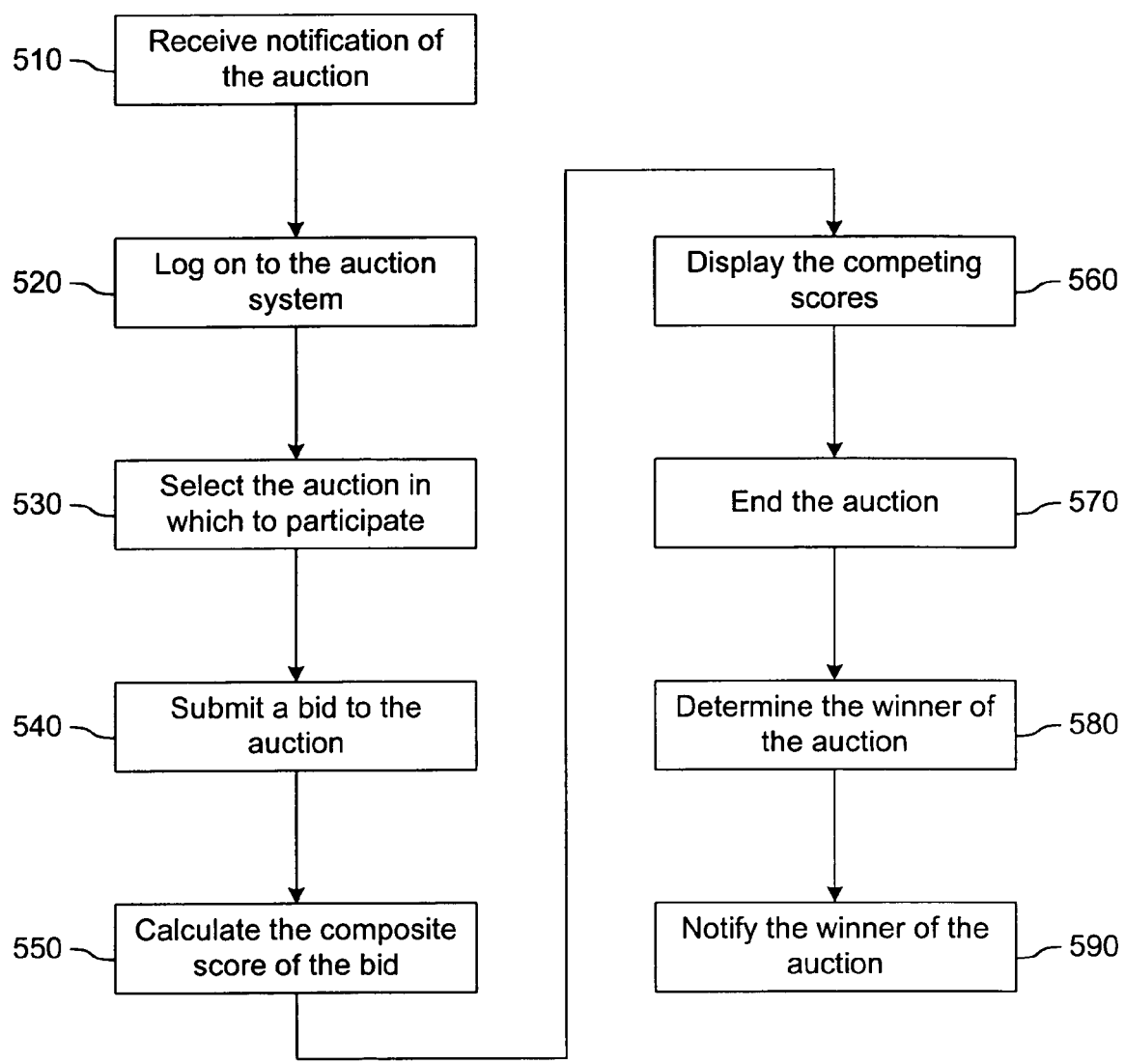
FIG. 5 is a flow diagram of a process for submitting and evaluating bids consistent with the present invention.

FIG. 5 is a flow diagram of a process for submitting and evaluating bids consistent with the present invention. As shown in FIG. 5, a participant 30 receives a notification of the auction submitted by the sponsor 20 (step 510). As discussed above, the notification may be by e-mail, which includes information about the auction including the time and subject of the auction.

In response to the notification, the participant 30 logs on to the auction system 50 (step 520). The time that the participant 30 logs on to the auction system 50 is specified by the auction information in the e-mail. To log on to the auction system 50, the participant 30 may be required to provide a username and password established from a prior registration with the auction system 50.

Once logged on to the auction system 50, the participant 30 selects the auction in which to participate (step 530). A list of auctions may be presented to the participant 30, and the participant 30 selects the auction from the list. Alternatively, the participant 30 may submit a codename or identification number, which has been provided in the e-mail notification, to the auction system, and the auction system automatically identifies the applicable auction based on the codename or identification number.

After selecting the applicable auction, the participant 30 may submit a bid (step 540). The participant 30 may submit the bid by clicking on a button on a GUI presented to the participant 30 or by selecting a create a bid option from a pull down menu. If the sponsor 20 has designated the structure and content of the bids to be submitted, the participant 30 may fill-in information in editable fields corresponding to the content requested by the sponsor 20, such as the timing or intervals over which the product will be delivered, the bid price, and how much of the product will be provided. The participant 30 may also enter additional information or comments about its bid, such as better prices available for increased amounts of the product.

The bid information also includes all of the information needed for the selected categories of the composite scoring system. In the example of FIG. 4a, the selected categories that are participant-entered include price, distance and lead time. Accordingly, for these categories, the participant 30 would provide a bid price, its distance from the sponsor 20 and the lead time the participant 30 would need for the delivery or reception of the product or service.

A composite score is then calculated for the submitted bid (step 550). The composite score is dependent upon the values provided in the bid by the participant 30, the parameters for the categories selected by the sponsor 20, the weightings specified for the categories by the sponsor 20, and the values set by the sponsor for any sponsor-entered categories. In one aspect of the invention, the parameters for the categories are used to scale the values provided in the bid and any values set by the sponsor. The scaled values are then adjusted by the weightings specified for the categories. The adjusted values are summed together to produce the composite score.

The following example explains the process for calculating the composite score. Assuming the composite score is based on three categories, the parameters for the categories one to three may be 0 to 10, 0 to 100 and 0 to 1000, respectively. It is assumed that the higher value is better in each category, i.e. 10 is perfect in the first category. The weightings may be 50%, 30% and 20%, respectively. The values for the categories one to three, which may be in the bid or be sponsor-entered, are 7, 50 and 350.

Given these parameters, weightings and values, the first step is to scale the values. In the first category, the scaled values would be 0.7, i.e., 7 divided by 10. The scaled values in the second and third categories would be 0.5 and 0.350, respectively. The scaled values are adjusted by multiplying each scaled value with the corresponding weighting. The resulting adjusted values would be 35, 15, and 7. The composite score is then determined by the sum of the adjusted values, which is 57 out of 100.

The composite score calculated for the bid, along with the competing scores, is then displayed to the participant 30 (step 560). After each bid is submitted, a determination is made as to whether the submitted bid results in the highest calculated score. If it is the highest calculated score, an indication of the score may be displayed to each of the participants. The display of the highest score is preferably updated each time a newly submitted bid results in calculated score exceeding the current highest score.

FIG. 6 is an example of a view of a graphical user interface used in conjunction with the process of FIG. 5 showing the scores displayed to the participant 30. As shown in FIG. 6, a first window may display general auction information that has been provided by the sponsor 20 when the sponsor 20 submitted the auction to the auction system 50. A second window displays the composite score for the bid currently being considered by the participant 30, and the raw unweighted values of each category prior to weighting and inclusion in the bid, such as price and distance. The leading bid, i.e., the highest calculating composite score of all of the competing bids of the participants, and the score for the previous or most recent bid of the participant 30 are also shown. As described above, the leading bid is preferably updated for each participant each time the calculated score of a newly submitted bid exceeds the current leading bid.

The second window further includes information about the relative weighting of each category. The relative weighting indicates the weighting given to each category relative to the other categories. In the example shown in FIG. 6, the price is given the highest weighting, the lead time is given the next highest, and the distance is given the lowest. It is also possible to have the weightings between categories be the same or to show the actual weightings given to the categories by the sponsor.

The participant 30 may have the system determine the composite score of a bid before submitting the bid and to see how permutations of the individual values for the various categories could affect the composite prior to submission. After entering the values for the various categories, the participant 30 would select "Check Score." The resulting composite score, which is not submitted until specified by the participant 30, is displayed to the participant 30. In the example of FIG. 6, the score of the bid currently being considered by the participant 30 would be 83.

The auction ends after all of the participants 30 have submitted bids or at a time set by the sponsor 20 (step 570). Alternatively, the sponsor 20 may specify that the auction ends when a certain number of bids have been submitted or when the rate at which bids are being submitted drops below a particular level.

Once the auction is over, the winner of the auction is determined (step 580). Awarding the winner of the auction is facilitated through the use of the composite scores, which are stored in a database maintained in the storage 54. A sponsor 20 may choose to automatically award the winner of the auction once an auction has ended by automatically selecting the participant 30 who submitted the bid with the highest composite score. Alternatively, the sponsor 20 may manually award the auction, viewing both the composite score and the values set in the bid to determine which participant 30 to award the auction. The winner of the auction is then notified (step 590). The winner may be notified, for example, by e-mail.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for conducting an auction for a sponsor, comprising:
   receiving score computation information, at an auction system computer, for computing respective composite scores for respective bids submitted to the auction, the score computation information for computing a composite score comprising:
   a selection of a plurality of categories as evaluation criteria for the bid;
   a setting of parameters for each of the selected categories; and
   a weight specified for each of the selected categories;
   receiving a bid from one or more participants, the bid including bid information corresponding to the selected categories;

calculating a weighted value for each one of the selected categories based on the parameters and weight for each of the selected categories and the bid information;

determining the composite score for each received bid based on the weighted values for each of the selected categories; and identifying the bid having the highest composite score, wherein at least one of the selected categories is set to a value provided by the sponsor, and wherein the at least one of the selected categories set to a value provided by the sponsor relates to an evaluation of the participant by the sponsor, wherein the step of receiving a bid from one or more participants comprises:

receiving values corresponding to the selected categories before the bid is submitted;

calculating a weighted value for each one of the selected categories based on the parameters and weight for each of the selected categories and the received values;

determining the composite score based on the weighted values for each of the selected categories; and displaying the composite score to the participant from which the values were received before the bid is submitted.

2. A method according to claim 1, further comprising:
receiving a designation of the participants who may submit bids to the auction.

3. A method according to claim 2, further comprising:
sending a notification to each of the participants based on the received designation.

4. A method according to claim 1, wherein the plurality of categories include a price, a distance, a quality, a volume and a lead time.

5. A method according to claim 1, further comprising:
notifying the participant having the bid identified as having the highest composite score.

6. A method according to claim 1, wherein the information for setting the composite score further comprises a selection of at least three of the plurality of categories as evaluation criteria for the bid.

7. A method according to claim 1, wherein the information in the bid includes values corresponding to the selected categories.

8. A method according to claim 7, wherein the calculating of a weighted value for each one of the selected categories comprises:

scaling the values included in the information in the bid with the parameters set for each of the selected categories; and adjusting the scaled values with the weight specified for each of the selected categories.

9. A method according to claim 8, wherein the determining of the composite score further includes summing the adjusted values.

10. A computer program product comprising:
a computer readable medium having program code recorded thereon that is operable on a computer system for conducting an auction for a sponsor, the program code on the computer readable medium, when executed on a computer system, configured to:

receive score computation information for computing respective composite scores for respective bids submitted to the auction, the score computation information for computing a composite score comprising:

a selection of at least a plurality of categories as evaluation criteria for the bid;

a setting of parameters for each of the selected categories; and a weight specified for each of the selected categories;

receive a bid from one or more participants, the bid including bid information corresponding to the selected categories;

calculate a weighted value for each one of the selected categories based on the parameters and weight for each of the selected categories and the bid information in the bid;

determine the composite score for each received bid based on the weighted values for each of the selected categories; and identify the bid having the highest composite score, wherein at least one of the selected categories is set to a value provided by the sponsor, and wherein the at least one of the selected categories set to a value provided by the sponsor relates to an evaluation of the participant by the sponsor, wherein receive a bid from one or more participants comprises:

receive values corresponding to the selected categories before the bid is submitted;

calculate a weighted value for each one of the selected categories based on the parameters and weight for each of the selected categories and the received values;

determine the composite score based on the weighted values for each of the selected categories; and display the composite score to the participant from which the values were received before the bid is submitted.

11. A computer program product according to claim 10, further configured to:
receive a designation of the participants who may submit bids to the auction.

12. A computer program product according to claim 11, further configured to:
send a notification to each of the participants based on the received designation.

13. A computer program product according to claim 10, wherein the plurality of categories include a price, a distance, a quality, a volume and a lead time.

14. A computer program product according to claim 10, further configured to:
notify the participant having the bid identified as having the highest composite score.

15. A computer program product according to claim 10, wherein the information for setting the composite score further comprises a selection of at least three of the plurality of categories as evaluation criteria for the bid.

16. A computer program product according to claim 10, wherein the information in the bid includes values corresponding to the selected categories.

17. A computer program product according to claim 16, further configured to:

scale the values included in the information in the bid with the parameters set for each of the selected categories; and adjust the scaled values with the weight specified for each of the selected categories.

18. A computer program product according to claim 17, further configured to:
sum the adjusted values.

* * * * *